United States Patent
Kang et al.

(10) Patent No.: US 6,477,013 B1
(45) Date of Patent: Nov. 5, 2002

(54) SLIDER AIR BEARING DESIGN AND METHOD PROVIDING WRITING OF A LASER FIELD (WOLF) MEASUREMENT WITHOUT SUBSTANTIAL FLY HEIGHT AFFECT

(75) Inventors: Soo-Choon Kang, San Jose; Mark C. McMaster, Menlo Park; Tony Jing Zhang, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 09/710,981

(22) Filed: Nov. 9, 2000

(51) Int. Cl.[7] .............................................. G11B 17/32
(52) U.S. Cl. .................................................. 360/236.3
(58) Field of Search ................................ 360/236–236.8

(56) References Cited

U.S. PATENT DOCUMENTS

| | | | |
|---|---|---|---|
| 4,866,553 A | | 9/1989 | Kubo et al. |
| 5,404,258 A | * | 4/1995 | White ..................... 360/236.3 |
| 5,761,008 A | | 6/1998 | Sato |
| 5,777,825 A | | 7/1998 | Dorius |
| 5,940,249 A | | 8/1999 | Hendriks |
| 5,953,181 A | * | 9/1999 | Utsunomiya ............. 360/236.3 |
| 6,021,020 A | * | 2/2000 | Itoh et al. ................ 360/236.3 |
| 6,055,128 A | * | 4/2000 | Dorius et al. ............ 360/236.3 |
| 6,069,770 A | * | 5/2000 | Cui et al. ................ 360/236.6 |
| 6,075,604 A | | 6/2000 | Crawforth et al. |
| 6,125,005 A | * | 9/2000 | Lee et al. ................ 360/236.1 |
| 6,144,529 A | * | 11/2000 | Wada et al. ............. 360/236.3 |
| 6,172,851 B1 | * | 1/2001 | Utsunomiya ............. 360/236.3 |
| 6,349,018 B2 | * | 2/2002 | Koishi et al. ............ 360/236.3 |

FOREIGN PATENT DOCUMENTS

| | | |
|---|---|---|
| JP | 59-178648 | 10/1984 |
| JP | 2-230575 | 9/1990 |
| JP | 6-36488 | 2/1994 |
| JP | 6-150283 | 5/1994 |
| JP | 9-293223 | 11/1997 |
| JP | 10-3635 | 1/1998 |

* cited by examiner

Primary Examiner—Allen Cao
(74) Attorney, Agent, or Firm—Altera Law Group, LLC

(57) ABSTRACT

A slider air bearing design and method providing "writing of laser field" (WOLF) measurement without substantial fly height affect. A central pad at ion-mill height is formed in the cavity between the side rails and rear pad. The central pad allows correlation of WOLF crown measurement values with crown measurements obtain via optical interferometer. Also, the central pad provides good reflective areas while preventing degradation in fly height performance due to the rear pad geometry constraints required by the WOLF measurement process.

23 Claims, 6 Drawing Sheets

SLIDER AIR BEARING DESIGN AND METHOD PROVIDING WRITING OF A LASER FIELD (WOLF) MEASUREMENT WITHOUT SUBSTANTIAL FLY HEIGHT AFFECT

BACKGROUND OF THE INVENTION

1. Field of the Invention

This invention relates in general to data storage systems, and more particularly to a slider air bearing design and method providing writing of laser field measurement without substantial fly height affect.

2. Description of Related Art

Fixed magnetic disk systems, typically referred to as "hard" disk drives, are now commonplace as the main non-volatile storage in modern personal computers, workstations, and portable computers. Such hard disk drives are now capable of storing gigabyte quantities of digital data, even when implemented in portable computers of the so-called "notebook" class. Many important advances have been made in recent years that have enabled higher data density and thus larger storage capacities of hard disk drives, and that have also enabled much faster access speeds, both in the bandwidth of data communicated to and from the hard disk drive, and also in the access time of specified disk sectors. Advances have also been made that have greatly reduced the size and weight of hard disk drives, particularly as applied to portable computers, have been made over recent years. These advances have resulted in the widespread availability of ultra-light portable computers, yet having state-of-the art capability and performance.

A head/disk assembly typically comprises one or more commonly driven magnetic disks rotatable about a common spindle and cooperating with at least one head actuator for moving a plurality of transducers radially relative to the disks so as to provide for the reading and/or writing of data on selected circular tracks provided on the disks. The magnetic transducer or "head" is suspended in close proximity to a recording medium, e.g., a magnetic disk having a plurality of concentric tracks. The transducer is supported by an air bearing slider mounted to a flexible suspension. The suspension, in turn, is attached to a positioning actuator.

During normal operation, relative motion is provided between the head and the recording medium as the actuator dynamically positions the head over a desired track. The relative movement provides an air flow along the surface of the slider facing the medium, creating a lifting force. The lifting force us counterbalanced by a predetermined suspension load so that the slider is supported on a cushion of air. Air flow enters the leading edge of the slider and exits from the trailing end. The head resides near the trailing end, which tends to fly closer to the recording surface than the leading edge.

The recording medium holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Fly height stability is determined by proper suspension loading and by shaping the air bearing slider surface (ABS) for desirable aerodynamic characteristics.

One important design factor for fly height is the slider's resistance to changing conditions. If the transducer fly height does not stay constant during changing conditions, data transfer between the transducer and the recording medium may be adversely affected. Fly height is further affected by physical characteristics of the slider such as the shape of the ABS. Optimized rail shaping, for example, can provide enough resistance to changes in air flow.

Hard drive manufactures are starting to incorporate proximity recording type sliders in drives in order to achieve higher storage densities. The proximity recording slider is designed to maintain a small area near the read-write element in constant contact with the disk, and thus enabling smaller bit size and ultimately larger storage densities. This approach to increasing storage density puts considerable amount of strain on controlling wear at the slider-disk interface, because a slight variation in contact load and contact area could greatly affect the drive survivability.

Slider-disk contact results in lubricant depletion and degradation, wear of both surfaces, generation of wear particles, stick-slip, etc. All these phenomena affect reliability of the disk drive, e.g., through jitter, as well as its durability.

To continue the increases being made in data-storage density, drive designs call for lower and lower slider fly height. For a magnetic head slider with an ABS pattern, there are numerous slider-curvature parameters and curvature-adjust techniques (CATs) that are considered important for fly height control and tribology. Crown is the maximum separation of the cylindrical contour along the flying direction from an imaginary plane drawn between the leading and trailing edges of the ABS. Camber has a similar definition and is the separation from an imaginary plane drawn perpendicular to the flying direction between the two side edges of the slider. Twist is the difference of the "diagonal" cylindrical curvatures.

For modern pico sliders, these curvature parameters are typically on the order of several nanometers, while the slider width and length are about 1 mm. The actual curvatures of the ABS are therefore truly minute. However, the variance of the crown is a key factor in slider performance.

Fly-height modeling of common "negative-pressure air bearing" sliders indicates that small changes of a few nanometers in the crown can significantly affect the fly height of the slider. Hence there has been an obvious need to develop and implement a method to finely adjust crown.

One technique involves for adjusting crown is "laser scribing", which refers to the exposure of the slider surface-typically the back or flex side-to sufficiently intense laser irradiation such that a permanent surface modification is produced. The technique of laser scribing to produce surface-stress change is very desirable because laser scribing is non-contact and fast, and there is no mechanical wear and tear of any contact device like a grinding wheel or a diamond scriber; it is more precise, since the positioning of the focused laser beam can be accurately controlled using galvo mirrors and machine vision; and it is more amenable to an in-situ closed-loop control that terminates the scribing when the target crown or camber is reached.

Preferably, laser scribing is performed on the flex side to induce positive curvature changes at the ABS. This is a significant advantage compared to scribing or modifying the ABS side, since any debris that is not cleaned or washed away is much less offensive at the flex side compared to the ABS side. The use of a high-pulse-repetition-rate laser permits rapid processing of the slider by quickly scanning the spot on the surface to produce the scribe pattern required to provide the desired curvature change.

There are various non-contact optical techniques for in-situ monitoring of slider curvature that provide closed-loop control with laser scribing. Applicable optical monitoring techniques include probe-beam deflection sensing (PDS) techniques-used frequently in atomic force microscopy and photothermal beam-deflection spectroscopy and interferometer imaging.

However, one approach involves the "Writing Of a Laser Field" (WOLF) on suitable areas of the slider ABS surface by telecentric scanning of a probe laser beam and monitoring the directions of the scanning reflected laser beam. This WOLF technique is basically a multi-beam differential PDS technique. As a result, it is insensitive to static tilts of the slider surface, unlike the single-beam PDS method. Compared to interferometry, the WOLF method is much faster-providing a crown measurement in 10 milliseconds rather than a few seconds, as in interferometric techniques. Nonetheless, the WOLF method does not typically provide an absolute measurement of crown or camber and so the WOLF measured values have to be converted to a crown value via a calibration procedure that produces a lookup table.

For example, one slider design, Negative Pressure Bobsled Slider (NPBS), is widely used in mobile, desktop, and server products, as well as OEM head products because of its superior flying performances and easiness in ABS design. NPBS has two separated front ABS pads and one island pad at the trailing end. Typically these pads are surrounded by ion milled pads to produce step tapers. In view of the above discussions regarding crown, one common aspect observed for NPBS is that fabrication crown is one of the key process parameters controlling fly height variations. Several method have been used to measure and adjust crown during fabrication to improve process capability without sacrificing the throughput.

The most advanced method up to date is to use the above-described WOLF method as the measurement system for crown adjust. As mentioned, the most important advantage of the WOLF process is its speed which allows every slider to be measured multiple times during crown adjust while still maintaining an acceptable throughput. However, a major problem exists when using the WOLF process to measure the crown of the NPBS type of ABS. The problem is that the crown values given by the WOLF process do not always correlate well with those measured by the optical interferometer even when the WOLF measurement system is calibrated using actual sliders with known interferometric crown values. Because crown measured using interferometers is considered more accurate and is the widely accepted industry standard, without a good correlation, the WOLF process cannot be a totally independent measurement system and its application is greatly limited.

Another problem of the WOLF system is that it requires good reflective areas with minimum size of 150 micrometer×150 micrometer at both front and rear side of the slider. From ABS design point of view, to have two front pads of larger than 150 micrometer×150 micrometer in size is not a problem. However, the pad geometry constraints imposed on rear pad degrades fly height performance. The larger rear pad geometry makes the fly height sensitive to the crown.

It can be seen that there is a need for a slider air bearing design that allows correlation of WOLF crown measurement values with crown measurements obtain via optical interferometer.

It can also be seen that there is a need for slider air bearing design that provides good reflective areas while preventing degradation in fly height performance due to the rear pad geometry constraints required by the WOLF measurement process.

SUMMARY OF THE INVENTION

To overcome the limitations in the prior art described above, and to overcome other limitations that will become apparent upon reading and understanding the present specification, the present invention discloses a slider air bearing design and method providing writing of laser field measurement without substantial fly height affect.

The present invention solves the above-described problems by providing a central pad at ion-mill height in the cavity between the side rails and rear pad. The central pad allows correlation of WOLF crown measurement values with crown measurements obtain via optical interferometer. Also, the central pad provides good reflective areas while preventing degradation in fly height performance due to the rear pad geometry constraints required by the WOLF measurement process.

A slider in accordance with the principles of the present invention includes a slider body having a surface with a leading edge, a trailing edge and first and second side edges, first and second front air bearings positioned at the leading edge of the slider body along the first and second side edges, the first and second front air bearings including first and second front pads and a height selected for a predetermined fly height and second stepped surface side rails at an ion-milling height, a rear pad extending from the trailing edge and located substantially centrally between said sides of said slider, the rear pad including stepped surfaces at an ion-milling height, a negative pressure cavity positioned in the center of the slider body between the side rails and an ion-milling height center pad for providing a good reflective area for WOLF slider curvature measurements while insubstantially affect fly height, the center pad being positioned at the center of the slider within the negative pressure cavity.

Other embodiments of a slider in accordance with the principles of the invention may include alternative or optional additional aspects. One such aspect of the present invention is that the WOLF slider curvature measurements requires a minimum surface area, and wherein the center pad in combination with the rear pad meet the minimum surface area requirement with the center pad removing a size constraint on the rear pad.

Another aspect of the present invention is that the center pad enables the rear pad to be optimized to improve slider performance.

Another aspect of the present invention is that the slider curvature measurements comprise slider crown measurements and the slider performance comprises crown sensitivity.

Another aspect of the present invention is that the center pad comprises angled edges to help smooth particle trajectory, and maximize the effective surface area along the path of the WOLF slider curvature measurements.

Another aspect of the present invention is that the center pad allows an angle for the rear pad to be measured independently from the angle for the first and second front pads.

Another aspect of the present invention is that the center pad decouples the slider curvature measurements of the front pads and the rear pad and enables the use of a combined top pad and rear pad angle to model fly height rather than the traditionally defined crown.

Another aspect of the present invention is that the center pad is formed at a height between 180 nanometers and 280 nanometers below the height of the first and second front pads and the rear pad.

Another aspect of the present invention is that the ion-mill height of the center pad is at least 6 times higher than the fly height measured at the pole tip.

Another aspect of the present invention is that the center pad has a width of 150 micrometers along the path of slider curvature measurements.

In another embodiment of the present invention a disk drive is provided. The disk drive includes at least one rotating disk, a recording medium, disposed on the at least one rotating disk, the recording medium dragging air as the disk rotates and creating an air flow in parallel with a tangential velocity of the disk rotation, an actuator assembly disposed adjacent the at least one rotating disk for positioning a suspension assembly relative to the recording medium and a slider disposed at a distal end of the suspension assembly for supporting a transducer above the rotating disk, the slider further comprising a slider body having a surface with a leading edge, a trailing edge and first and second side edges, first and second front air bearings positioned at the leading edge of the slider body along the first and second side edges, the first and second front air bearings including first and second front pads and a height selected for a predetermined fly height and second stepped surface side rails at an ion-milling height, a rear pad extending from the trailing edge and located substantially centrally between said sides of said slider, the rear pad including stepped surfaces at an ion-milling height, a negative pressure cavity positioned in the center of the slider body between the side rails and an ion-milling height center pad for providing a good reflective area for WOLF slider curvature measurements while insubstantially affect fly height, the center pad being positioned at the center of the slider within the negative pressure cavity.

In another embodiment of the present invention a method for making a slider with a central pad for facilitating WOLF slider curvature measurements is provided. The method includes forming a slider body having a surface with a leading edge, a trailing edge and first and second side edges, forming first and second front air bearings at the leading edge of the slider body along the first and second side edges, the first and second front air bearings including first and second front pads and a height selected for a predetermined fly height and second stepped surface side rails at an ion-milling height, forming a rear pad extending from the trailing edge and located substantially centrally between said sides of said slider, the rear pad including stepped surfaces at an ion-milling height, forming a negative pressure cavity in the center of the slider body between the side rails and forming an ion-milling height center pad for providing a good reflective area for WOLF slider curvature measurements while insubstantially affect fly height, the center pad being positioned at the center of the slider within the negative pressure cavity.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a slider air bearing design and method providing WOLF measurement without substantial fly height affect. A central pad at ion-mill height is formed in the cavity between the side rails and rear pad. The central pad allows correlation of WOLF crown measurement values with crown measurements obtain via optical interferometer. Also, the central pad provides good reflective areas while preventing degradation in fly height performance due to the rear pad geometry constraints required by the WOLF measurement process.

Figure 1:
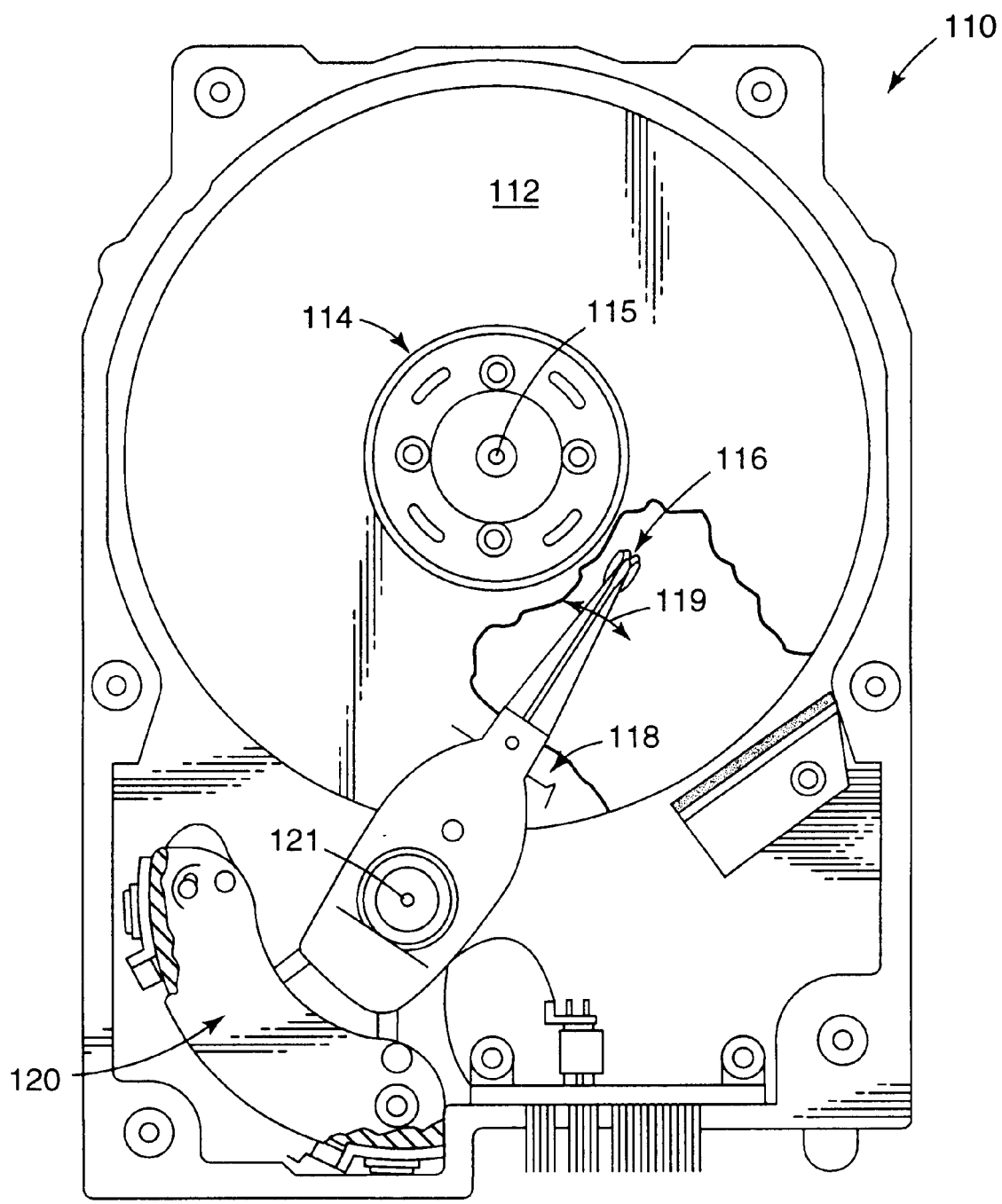
FIG. 1 is a plan view of a disk drive.

FIG. 1 is a plan view of a disk drive 100. Disk drive 100 includes a disk pack 112, which is mounted on a spindle motor (not shown) by a disk clamp 114. Disk pack 112, in one preferred embodiment, includes a plurality of individual disks which are mounted for co-rotation about a central axis 115. Each disk surface on which data is stored has an associated head gimbal assembly (HGA) 116 which is mounted to at least one actuator assembly 118 in disk drive 100. An actuator assembly as shown in FIG. 1 is of the type known as a rotary moving coil actuator and includes a voice coil motor (VCM) shown generally at 120. A voice coil motor 120 rotates an actuator assembly 118 with its attached HGAs 116 about a pivot axis 121 to position HGAs 116 over desired data tracks on the associated disk surfaces, under the control of electronic circuitry housed within disk drive 100.

More specifically, an actuator assembly 118 pivots about axis 121 to rotate head gimbal assemblies 116 generally along an arc 119 which causes each head gimbal assembly 116 to be positioned over a desired one of the tracks on the surfaces of disks in disk pack 112. HGAs 116 can be moved from tracks lying on the innermost radius, to tracks lying on the outermost radius of the disks. Each head gimbal assembly 116 has a gimbal which resiliently supports a slider relative to a load beam so that the slider can follow the topography of the disk. The slider, in turn, includes a transducer which is utilized for encoding flux reversals on, and reading flux reversals from, the surface of the disk over which it is flying.

Figure 2:
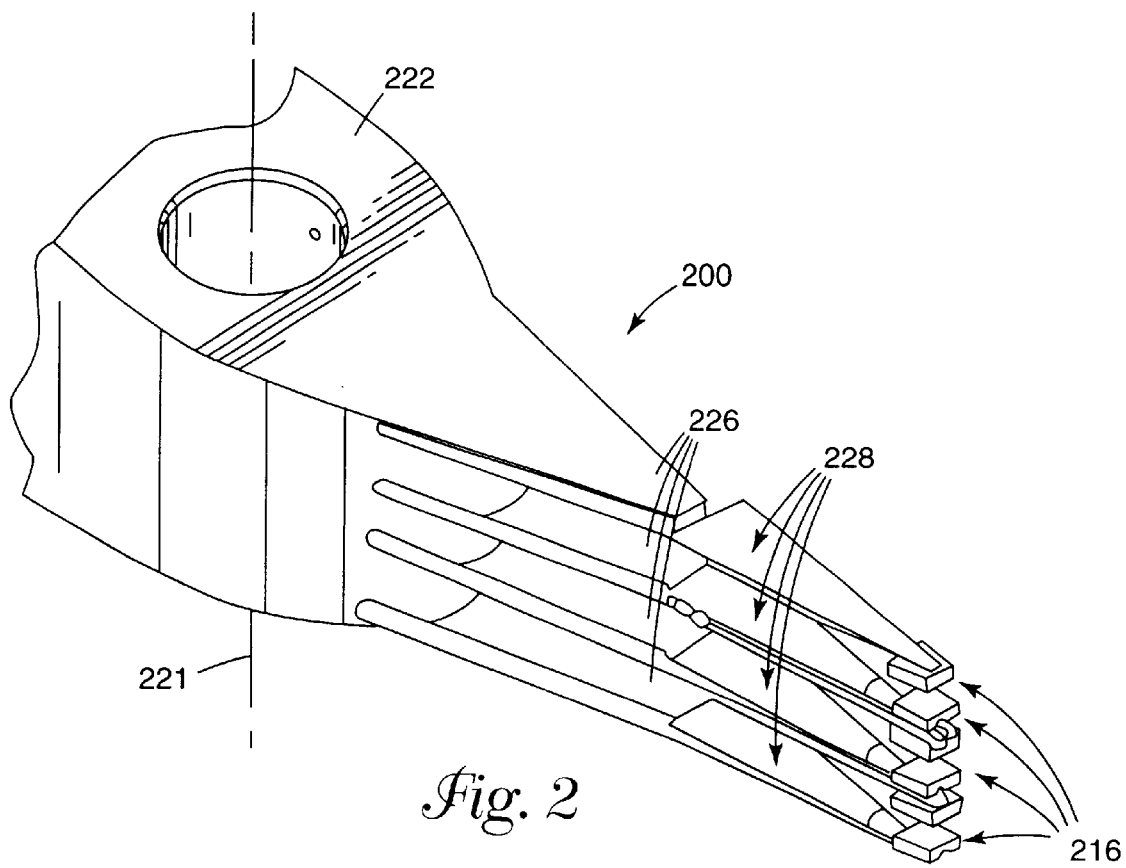
FIG. 2 is a perspective view of an actuator assembly.

FIG. 2 is a perspective view of an actuator assembly 200. Actuator assembly 200 includes base portion 222, a plurality of actuator arms 226, a plurality of load beams 228, and a plurality of head gimbal assemblies 216. Base portion 222 includes a bore which is, in the preferred embodiment, coupled for pivotal movement about axis 221. Actuator arms 226 extend from base portion 222 and are each coupled to the first end of either one or two load beams 228. Load beams 228 each have a second end which is coupled to a head gimbal assembly 216. According to the present invention, multiple, independently controlled actuator assemblies 200 are provided in a disk drive.

Figure 3:
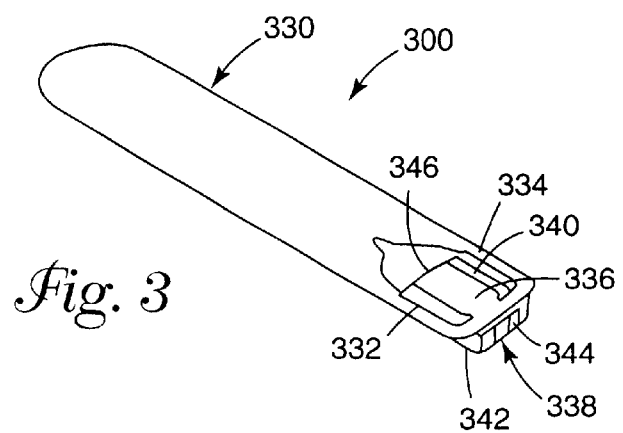
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338 which has an upper surface 340 and a lower, air bearing surface 342. Transducers 344 are also preferably located on a trailing edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

A conventional slider design starts off with a flat polished surface, from which a patterned ABS is created by a removal process such as etching or ion milling. The ABS is always the top most polished surface and pressurizes with positive pressure to lift the ABS up producing an air cushion above the disk. Air bearing surfaces are formed by single or dual etch processing which result in either 2 or 3 surface levels, respectively.

Figure 4:
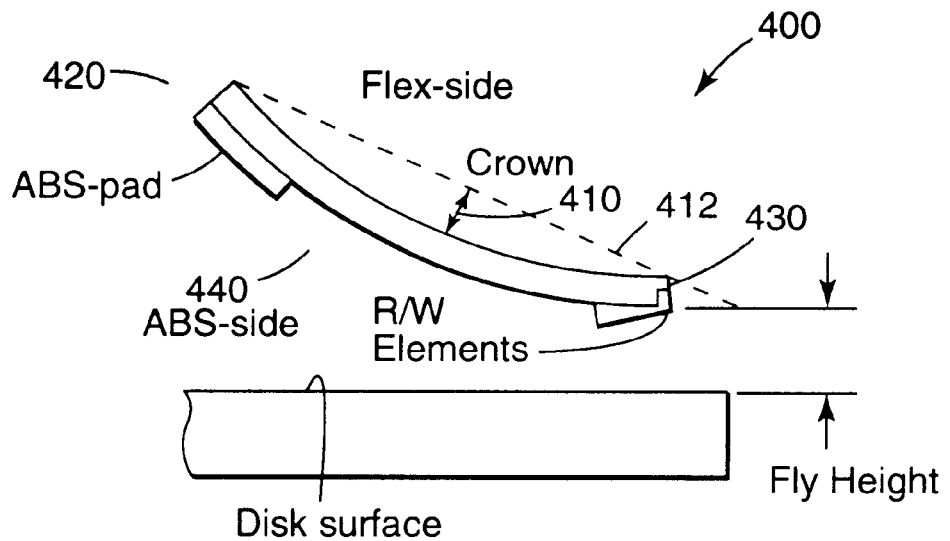
FIG. 4 illustrates the curvature parameters of a slider.

As described above, numerous slider curvature parameters are important for fly height control. FIG. 4 illustrates the curvature parameters of a slider 400. Crown is the maximum separation 410 of the cylindrical contour along the flying direction from an imaginary plane 412 drawn between the leading 420 and trailing 430 edges of the 440 ABS. The curvatures parameters are actually quite minute and are typically on the order of several nanometers (nm). The curvature of the ABS 440 of the slider shown in FIG. 4 is greatly exaggerated.

Figure 5:
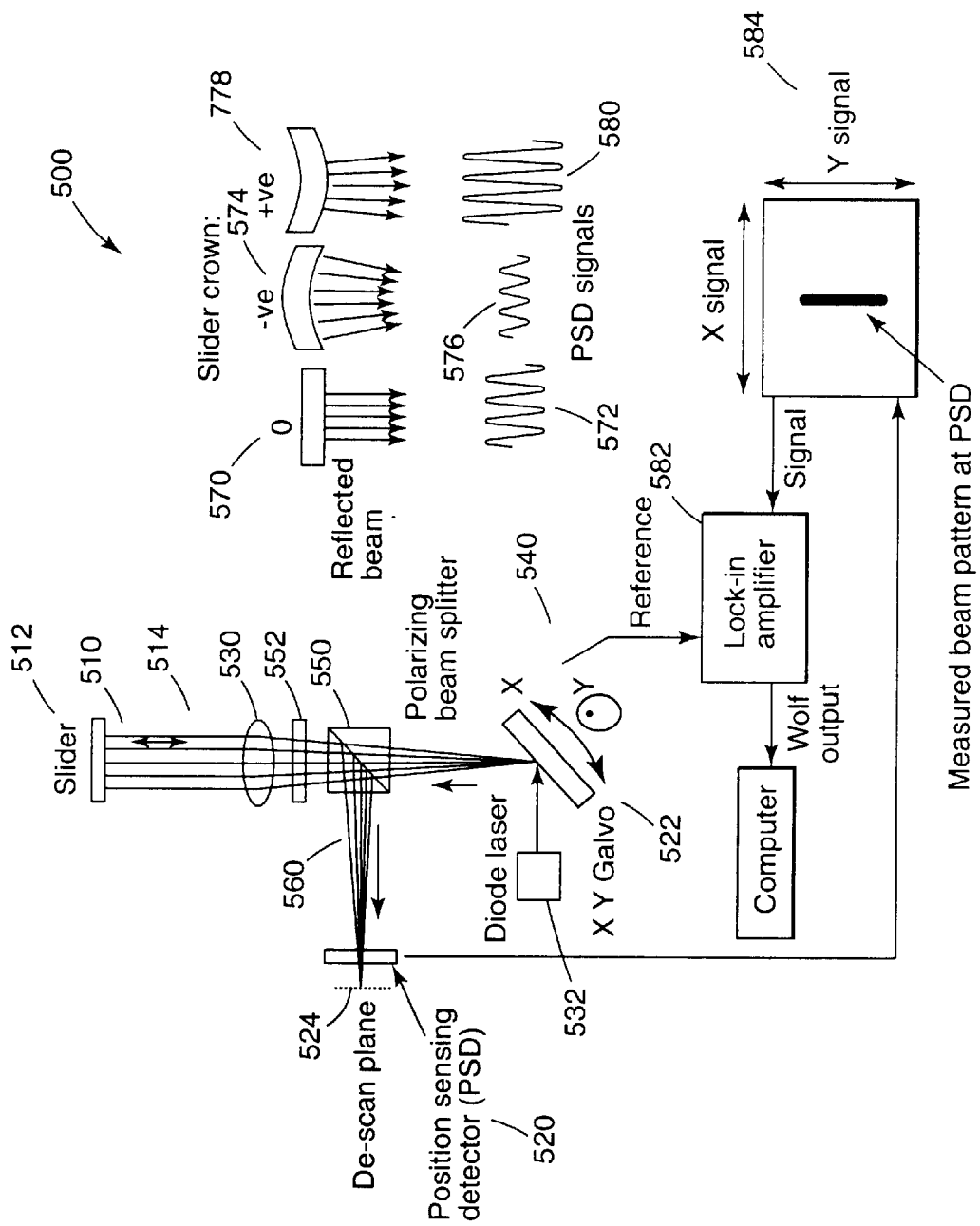
FIG. 5 illustrates a WOLF system for measuring slider curvature.

To measure crown, as well as other slider curvature parameters, the WOLF method at the ABS pads of the slider provides a fast noncontact optical measurement method. FIG. 5 illustrates a WOLF system 500 for measuring slider curvature. Writing of a laser field on suitable areas of the ABS 510 of a slider 512 by telecentric scanning of a probe laser beam 514 and monitoring the directions of the scanning reflected laser beam. This WOLF technique uses a multi-beam differential probe-beam deflection sensing (PDS) technique that uses a position sensitive detector 520. As a result, it is insensitive to static tilts of the slider surface, unlike a single-beam PDS method. Compared to interferometry, the WOLF method is much faster-providing a crown measurement in a few milliseconds, rather than a few seconds as in interferometric techniques.

As the acronym implies, the WOLF method is based on a fast-probe beam-scanning system, which includes a set of XY galvo mirrors 522 (or a set of acousto-optic deflectors) to produce or "write" a suitable laser field on the ABS 510 of the slider 512 with perpendicular incidence. A scan lens 530 is used to provide telecentric scanning of the probe laser 532 onto the slider surface 510, so that it both focuses the probe beam and scans perpendicularly on the slider surface.

The scan lens 530 is located at one focal length from the beam-scanning system 540 and the slider surface 510. A polarizing beam splitter 550 and a quarter-wave plate 552 are located between the galvo 522 and the lens 530. After traversing the quarter-wave plate 552 twice, the reflected beam 560 from the slider surface 510 will be diverted sideways by the polarizing beam splitter 550 onto a position sensitive detector 520 (PSD).

The PSD 520 is located sufficiently away from the de-scan plane 524 so that non-zero AC signals of the same phase are obtained from the PSD 520 for all expected crown values of the slider. The beams 560 are incident upon the ABS 510 at two spaced apart points and the curvature between the points is measured. If the slider crown is zero 570, the reflected scanning laser beams 560 are parallel and produce a certain PSD peak-to-peak signal 572. If the slider crown is negative 574, the reflected scanning laser beams 560 are convergent and produce a smaller PSD signal 576. Finally, if the slider crown is positive 578, the reflected scanning laser beams are divergent and produce a larger PSD signal 580.

As a result, the slider crown can be measured by using a lock-in amplifier 582 to measure the magnitude of the PSD oscillating signal that is phase-locked to the y-galvo scanning 584. The use of a lock-in amplifier 582 permits a narrow-band detection and hence enormous noise rejection, allowing the detection of crown changes of 1 nm or less.

However, as described above, the problem is that the crown values given by the WOLF technique do not always correlate well with those measured by the optical interferometer even when WOLF measurement system is calibrated using actual sliders with known interferometric crown values. Because crown measured using interferometers is considered more accurate and is the widely accepted industry standard, without a good correlation, the WOLF technique cannot be a totally independent measurement system and its application is greatly limited.

Another problem of the WOLF system is that it requires good reflective areas with minimum size of 150 um×150 um at both front and rear side of the slider. From ABS design point of view, to have two front pads of larger than 150 micrometer×150 micrometer in size is not a problem. However, the pad geometry constraints imposed on rear pad degrades fly height performance. The larger rear pad geometry makes the fly height sensitive to the crown.

Figure 6:
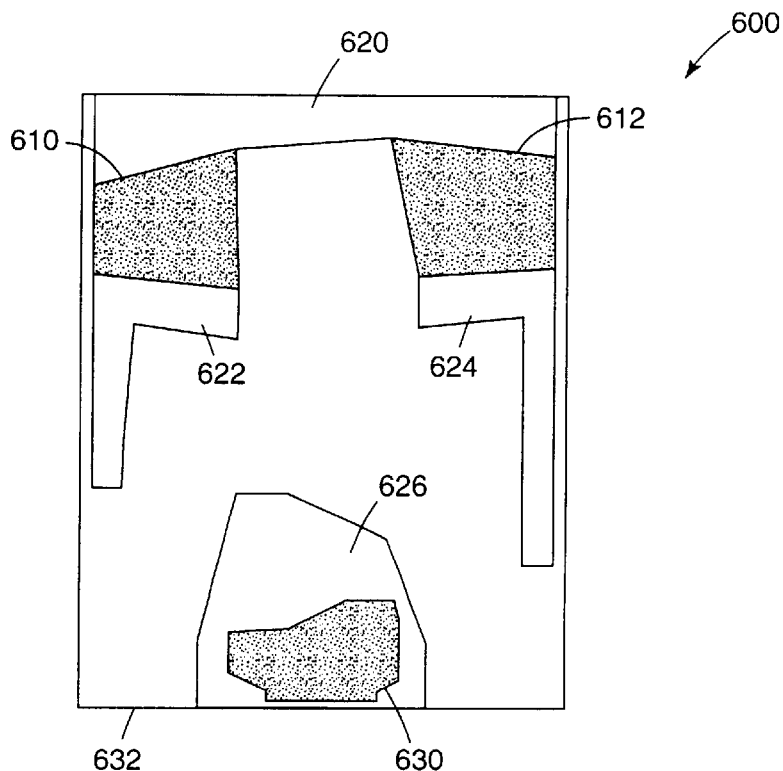
FIG. 6 illustrates a NPBS slider.

Recently, however, the origin of this problem is much better understood by a detailed analysis on interferometer flatness data of the NPBS sliders. FIG. 6 illustrates a NPBS slider 600. In FIG. 6, the slider 600 includes two separated front ABS pads 610, 612 and one island pad 630 at the trailing end 632, wherein the pads 610, 612, 630 are surrounded by ion milled pads 620, 622, 624, 626 to produce step tapers. Interferometer data show that the crown values have a good correlation with the angles of two front pads 610, 612, but poor correlation with the angles of the rear pad 630, especially when the rear pad 630 is small. In the WOLF set up, the angles of both front pads 610, 612 and the rear pad 630 are measured and they contribute to crown with equal weight. This measurement set up is dictated by the design of NPBS ABS 600.

Figure 7:
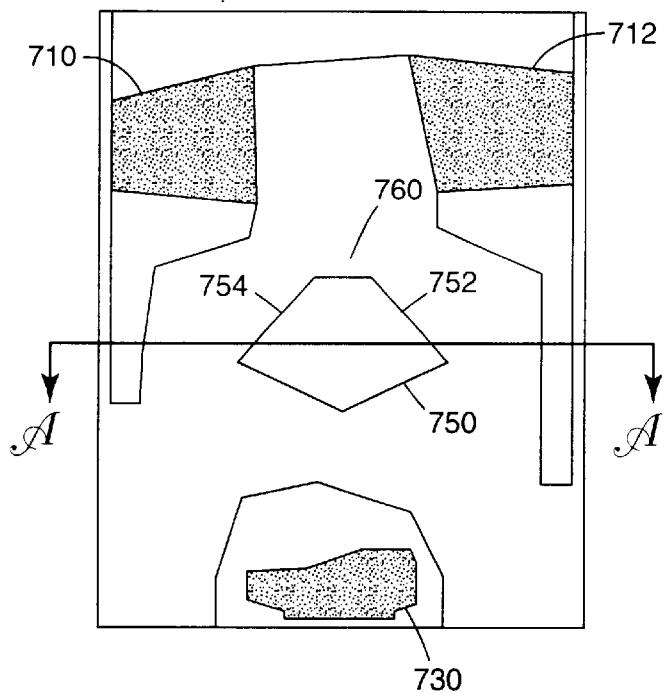
FIG. 7 illustrates the slider air bearing design according to the present invention for providing WOLF measurement without substantial affecting the fly height.

FIG. 7 illustrates the slider air bearing design 700 according to the present invention for providing writing of laser field measurement without substantial affecting the fly height. To overcome the problems described above with respect to the NPBS ABS 600, the present invention provides a center pad 750 at the geometrical center of the slider 700 within the cavity 760. The central pad 750 is at ion-mill height. The ABS design allows the top pad angle to be effectively measured by the WOLF method while providing the same fly performance as traditional the NPBS ABS. The WOLF slider curvature measurements require a minimum surface area. The center pad 750 in combination with the rear pad 730 meet the minimum surface area requirement with the center pad 750 providing a substantial portion of the total required surface area for the WOLF measurements thereby removing a size constraint on the rear pad. Thus, the crown values of the slider 700 according to the present invention that are measured using the WOLF process are better correlated with those measured using optical interferometer techniques. In addition, the smaller rear pad 730 may be optimized to improve crown sensitivity. Further, the central, ion-milled pad 750 has angled edges 752, 754 to help smooth particle trajectory, and maximize effective surface area along the path of WOLF measurements. The central pad 750 removes the size constraint imposed on rear pad 730 by the WOLF technique, and therefore, opens up opportunities for further improvement in fly height performance. In addition, the central pad 750 allows the angle for the rear pad 730 to be independently measured as well. The present invention also decouples the measurement of the front pads 710, 712 and the rear pad 730 and enables the use of a combined top pad and rear pad angle to model fly height rather than the traditionally defined crown.

Figure 8:
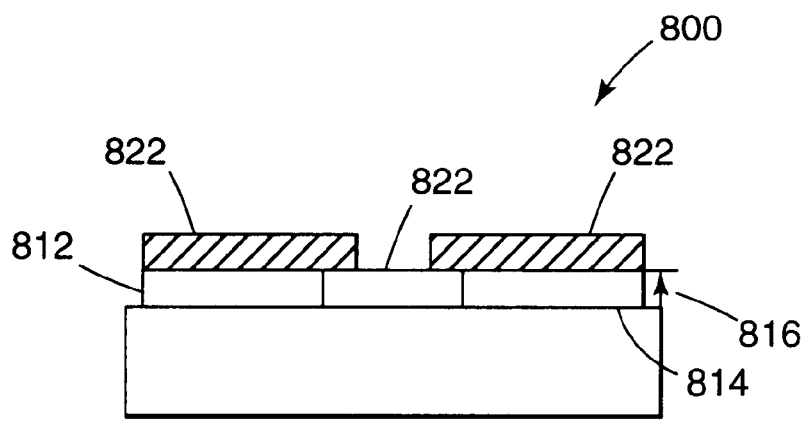
FIG. 8 illustrates a cross-sectional view of the slider of FIG. 7 along line A—A.

FIG. 8 illustrates a cross-sectional view of the slider of FIG. 7 along line A—A. FIG. 8 illustrates the center pad 810, side rails 812, 814 and front pads 820, 822. The center pad is shown being at the ion-milling height 816. The center pad 810 is at ion-mill which is typically 180 nm or 280 nm below ABS of the front pads 820, 822 or rear pad (not shown in FIG. 8). Therefore, there will be minimal or no impact on tribology performance of the slider. The ion-mill height is 6 to 10 times higher than the fly height measured at the pole tip. The center pad 810 formed at this height does not change fly height performance significantly. Moreover, the geometry of the center pad 810 is formed such that having 150 micrometer width along the path of WOLF measurement.

Figure 9:
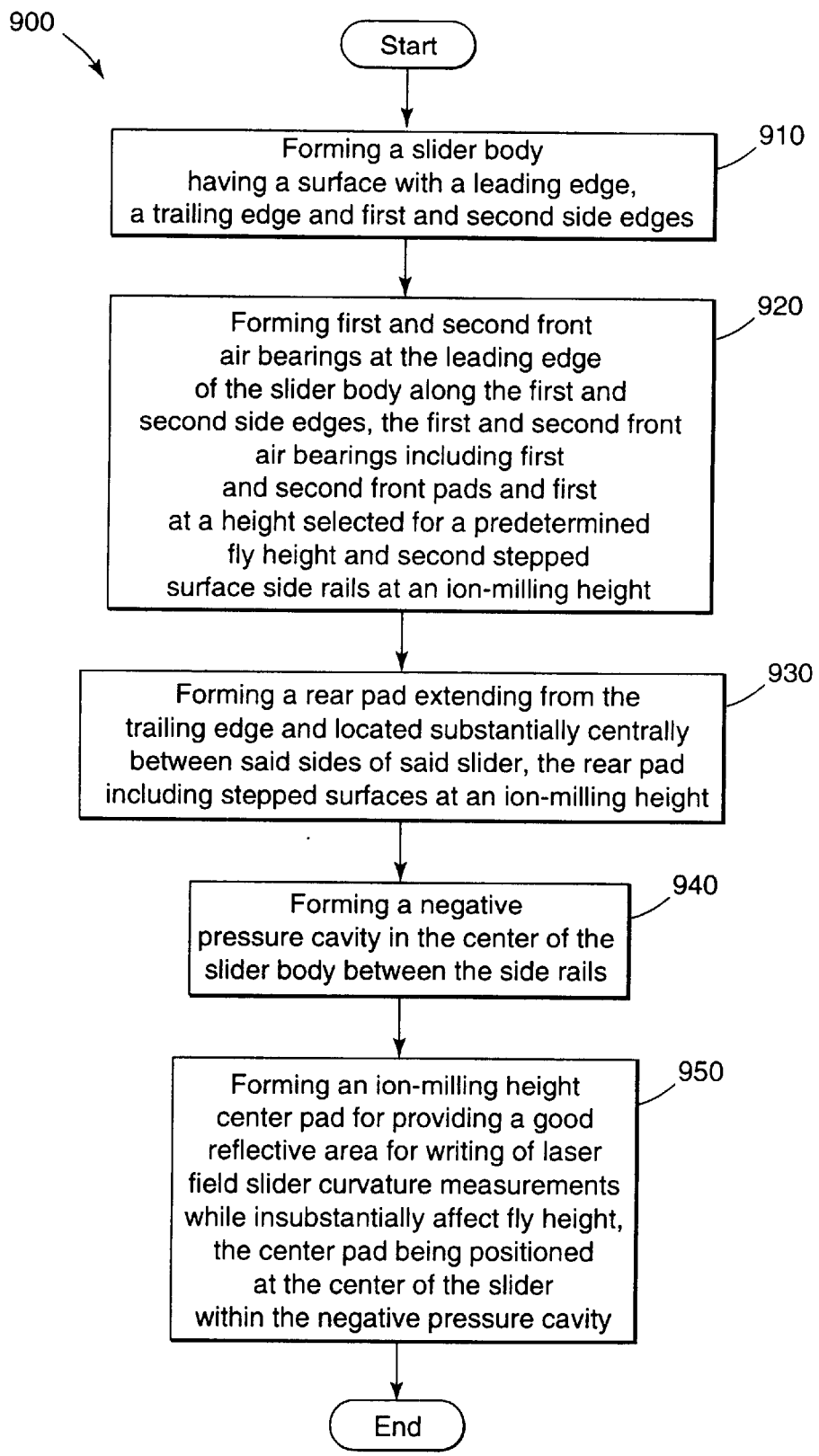
FIG. 9 illustrates a flow chart for making a slider with a central pad for facilitating WOLF slider curvature measurements according to the present invention.

FIG. 9 illustrates a flow chart 900 for making a slider with a central pad for facilitating WOLF slider curvature measurements according to the present invention. First, a slider body is formed having a surface with a leading edge, a trailing edge and first and second side edges. First and second front air bearings are formed at the leading edge of the slider body along the first and second side edges. The first and second front air bearings include first and second front pads and at a height selected for a predetermined fly height and second stepped surface side rails at an ion-milling height. A rear pad extending from the trailing edge and located substantially centrally between said sides of said slider is formed. The rear pad includes stepped surfaces at an ion-milling height. The first and second front air bearing surfaces create a negative pressure cavity in the center of the slider body between the side rails. An ion-milling height center pad is then formed in the negative pressure cavity for providing a good reflective area for writing of laser field slider curvature measurements while insubstantially affect fly height.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider, comprising:

a slider body having a surface with a leading edge, a trailing edge and first and second side edges;

first and second front air bearings positioned at the leading edge of the slider body along the first and second side edges, the first and second front air bearings including first and second front pads and a height selected for a predetermined fly height and second stepped surface side rails having a height selected to be substantially equal to an ion-mill height;

a rear pad extending from the trailing edge and located substantially centrally between said sides of said slider, the rear pad including stepped surfaces having a height selected to be substantially equal to an ion-mill height;

a negative pressure cavity positioned in the center of the slider body between the side rails; and a center pad having a height selected to be substantially equal to an ion-mill height, the center pad having a good reflective area for writing of laser field slider curvature measurements while insubstantially affecting fly height, the center pad being positioned at the center of the slider within the negative pressure cavity.

2. The slider of claim 1 wherein the writing of laser field slider curvature measurements requires a minimum surface area, and wherein the center pad in combination with the rear pad meet the minimum surface area requirement with the center pad removing a size constraint on the rear pad.

3. The slider of claim 2 wherein the center pad enables the rear pad to be optimized to improve slider performance.

4. The slider of claim 3 wherein the slider curvature measurements comprise slider crown measurements and the slider performance comprises crown sensitivity.

5. The slider of claim 1 wherein the center pad comprises angled edges to help smooth particle trajectory and maximize effective surface area along the path of the writing of laser field slider curvature measurements.

6. The slider of claim 1 wherein the center pad allows an angle for the rear pad to be measured independently from the angle for the first and second front pads.

7. The slider of claim 1 wherein the center pad decouples the slider curvature measurements of the front pads and the rear pad and enables the use of a combined top pad and rear pad angle to model fly height rather than the traditionally defined crown.

8. The slider of claim 1 wherein the center pad is formed at a height between 180 nanometers and 280 nanometers below the height of the first and second front pads.

9. The slider of claim 1 wherein the center pad is formed at a height between 180 nanometers and 280 nanometers below the height of the rear pad.

10. The slider of claim 1 wherein the ion-mill height of the center pad is at least 6 times higher than the fly height measured at the pole tip.

11. The slider of claim 1 wherein the center pad has a width of 150 micrometer along the path of slider curvature measurements.

12. A disk drive, comprising:

at least one rotating disk;

a recording medium, disposed on the at least one rotating disk, the recording medium dragging air as the disk rotates and creating an air flow in parallel with a tangential velocity of the disk rotation;

an actuator assembly disposed adjacent the at least one rotating disk for positioning a suspension assembly relative to the recording medium; and a slider disposed at a distal end of the suspension assembly for supporting a transducer above the rotating disk, the slider further comprising:

a slider body having a surface with a leading edge, a trailing edge and first and second side edges;

first and second front air bearings positioned at the leading edge of the slider body along the first and second side edges, the first and second front air bearings including first and second front pads and a height selected for a predetermined fly height and second stepped surface side rails having a height selected to be substantially equal to an ion-mill height;

a rear pad extending from the trailing edge and located substantially centrally between said sides of said slider, the rear pad including stepped surfaces having a height selected to be substantially equal to an ion-mill height;

a negative pressure cavity positioned in the center of the slider body between the side rails; and a center pad having a height selected to be substantially equal to an ion-mill height, the center pad having a good reflective area for writing of laser field slider curvature measurements while insubstantially affecting fly height, the center pad being positioned at the center of the slider within the negative pressure cavity.

13. The slider of claim 12 wherein the writing of laser field slider curvature measurements requires a minimum surface area, and wherein the center pad in combination with the rear pad meet the minimum surface area requirement with the center pad removing a size constraint on the rear pad.

14. The slider of claim 13 wherein the center pad enables the rear pad to be optimized to improve slider performance.

15. The slider of claim 14 wherein the slider curvature measurements comprise slider crown measurements and the slider performance comprises crown sensitivity.

16. The slider of claim 12 wherein the center pad comprises angled edges to help smooth particle trajectory and maximize effective surface area along the path of the writing of laser field slider curvature measurements.

17. The slider of claim 12 wherein the center pad allows an angle for the rear pad to be measured independently from the angle for the first and second front pads.

18. The slider of claim 12 wherein the center pad decouples the slider curvature measurements of the front pads and the rear pad and enables the use of a combined top pad and rear pad angle to model fly height rather than the traditionally defined crown.

19. The slider of claim 12 wherein the center pad is formed at a height between 180 nanometers and 280 nanometers below the height of the first and second front pads.

20. The slider of claim 12 wherein the center pad is formed at a height between 180 nanometers and 280 nanometers below the height of the rear pad.

21. The slider of claim 12 wherein the ion-mill height of the center pad is at least 6 times higher than the fly height measured at the pole tip.

22. The slider of claim 12 wherein the center pad has a width of 150 micrometer along the path of slider curvature measurements.

23. A method of forming a slider, comprising;

forming a slider body having a surface with a leading edge, a trailing edge and first and second side edges;

forming first and second front air bearings at the leading edge of the slider body along the first and second side edges, the first and second front air bearings including first and second front pads and a height selected for a predetermined fly height and second stepped surface side rails having a height selected to be substantially equal to an ion-mill height;

forming a rear pad extending from the trailing edge and located substantially centrally between said sides of said slider, the rear pad including stepped surfaces having a height selected to be substantially equal to an ion-mill height;

forming a negative pressure cavity in the center of the slider body between the side rails; and forming a center pad having a height selected to be substantially equal to an ion-mill height, the center pad having a good reflective area for writing of laser field slider curvature measurements while insubstantially affecting fly height, the center pad being positioned at the center of the slider within the negative pressure cavity.

* * * * *